A. NELSON AND O. H. HINNARD.
FIRE GRATE OVEN ATTACHMENT.
APPLICATION FILED OCT. 20, 1921.
1,424,584.
Patented Aug. 1, 1922.
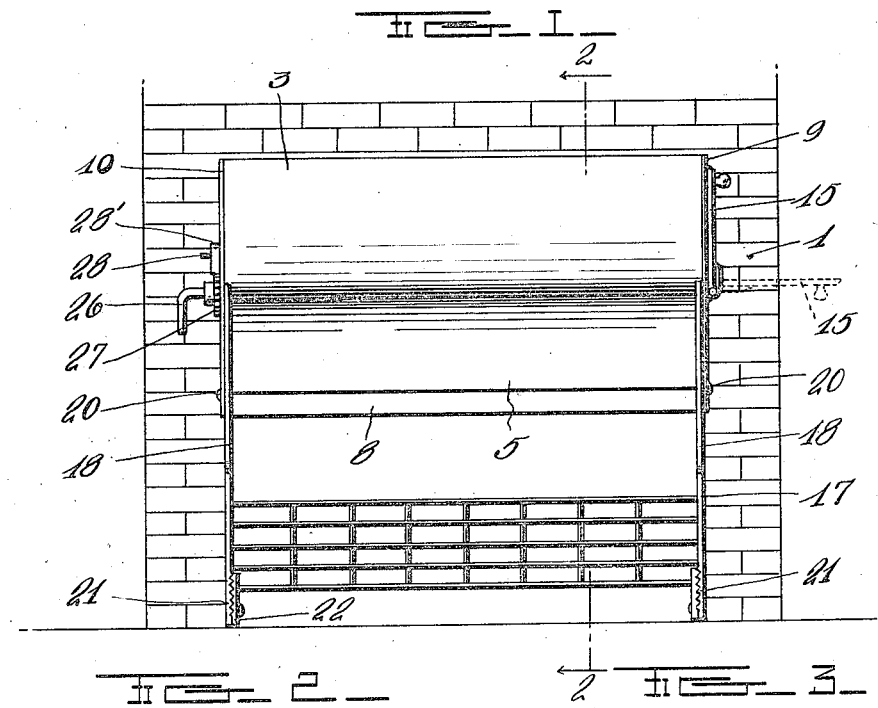
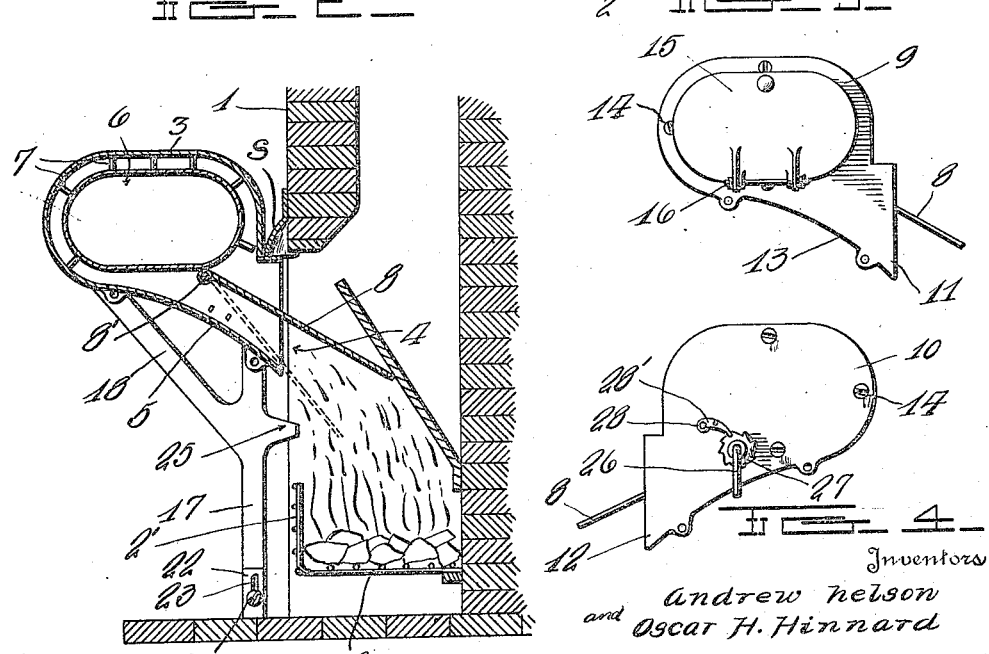
Inventors
Andrew Nelson
and Oscar H. Hinnard
By William C. Linton.
Attorney

UNITED STATES PATENT OFFICE.

ANDREW NELSON AND OSCAR H. HINNARD, OF CHATTANOOGA, TENNESSEE.

FIRE-GRATE OVEN ATTACHMENT.

1,424,584.  Specification of Letters Patent.  Patented Aug. 1, 1922.

Application filed October 20, 1921. Serial No. 509,014.

*To all whom it may concern:*

Be it known that we, ANDREW NELSON and OSCAR H. HINNARD, citizens of the United States of America, residing at Chattanooga, in the county of Hamilton and State of Tennessee, have invented certain new and useful Improvements in Fire-Grate Oven Attachments; and we do hereby declare that the following is a full, clear, concise, and exact description of the same, such as will enable others skilled in the art to which it appertains to make and use the same.

This invention relates to improvements in ovens having for an object to provide an oven particularly designed for use in connection with an open fire-place grate, whereby the heat from said fire-place, a major portion of which is ordinarily wasted, can be successfully used for heating the oven to a temperature at which it will properly cook or bake food stuffs placed therein.

Another object of the invention is to provide an oven of the character mentioned which may be attached to the grate of an open fire-place without alteration thereof and when positioned with respect to the fire-place will be positively prevented from accidental or undesired displacement; the manner of attaching the oven to the fire-place grate being such as will permit of adjustment of the same in order that the oven may be properly positioned with respect to the fire-place whereat it will receive a maximum supply of heat therefrom.

Yet another object of the invention is to provide an oven having a novel form of air ports, the inlet portion of which is controlled by an adjustable damper or heat deflector which may be manipulated to such a nicety as to permit the amount of heat passing into engagement with the oven proper to be varied according to the temperature to which it is desired to bring the oven.

Other objects will be in part obvious and in part pointed out hereinafter.

In order that the invention and its mode of application may be readily understood by persons skilled in the art, we have in the accompanying illustrative drawings and in the detailed following description based thereon, set forth one embodiment of the same.

In these drawings:—

Figure 1 is a front elevation of our improved oven showing the same in position with respect to an open fire-place;

Figure 2 is a vertical section therethrough taken on the line 2—2 of Figure 1 looking in the direction of the arrows;

Figure 3 is an end elevation of the oven; and,

Figure 4 is a similar view showing the opposite end of the oven and the heat deflector or damper adjusting handle.

Having more particular reference to the drawings in connection with which like characters of reference will designate corresponding parts throughout, we have shown our improved oven for purposes of illustration as used in conjunction with that type of open fire-place commonly found in modern homes, indicating said fire-place in its entirety by the numeral 1. In this connection, it is to be noted that the fire-place is provided with the usual grate 2, the forward portion of which is up-standing or vertical as indicated at 2', while an ornamental sheathing *s* of ordinary design is arranged adjacent its top.

The improved oven may be stated to consist of an elongated sheet metal housing 3, preferably oval in cross section as clearly shown in the Figure 2 and having a longitudinally disposed port 4 formed in the inner side of the lower portion thereof, whereby the heat from the fire-place 1 may be caused to circulate about the oven proper which will be presently described. In forming this longitudinal port 4, we may and preferably do form diagonal flanges 5 on its opposite sides whereby to afford abutments for the damper or heat deflecting elements which also will be hereinafter more fully described. Those walls of the housing 3 adjacent the port 4 are formed with a lateral extension or lip 3, the upper portion of which is adapted to be engaged under the sheathing *s* whereby to effect connection between the two for stabilizing the device.

Arranged within the oval casing 3 is a correspondingly formed container 6, constituting the oven proper of the invention; this oven proper being supported within the casing 3 but spaced from the inner sides of the same through the medium of heat insulating supporting blocks 7.

In order that the in-going and out-going of heated air may be controlled into and from the space occurring about the oven 6 that is, between the same and the inner sides of the casing 3, we provide a damper or heat deflecting element 8, mounting the same upon a rod 8', which in turn, is rotatably mounted on suitable bearings formed in end plates 9 and 10.

The end plates 9 and 10, as will be noted, are of shape and size corresponding to the oval cross sectional shape of the casing 3 and oven proper 6 and are formed with inwardly arranged extensions 11 and 12, the inner sides of which are curved as at 13; said plates being secured in position upon the opposite ends of the casing 3 and oven proper 6 by means of screws 14 or other suitable fastening devices. In this connection, it is to be noted that the end plates 9 afford a closure for the space occurring between the adjacent ends of the casing 3 and oven proper 6, but that the same is formed with an oval opening corresponding in size and shape to the inner surface of the oven proper 6, thus affording a way through which food stuffs to be cooked may be introduced into the oven proper.

This opening is preferably closed by means of a vertically swinging door 15, mounted upon bearing means 16 arranged on the lower side of the outer space of said end plate 9. The end plate 10 is of solid formation throughout and provides a positive closure for the opposite open ends of the casing 3 and oven proper 6.

Supporting legs 17 are provided the oven and have cradles 18 formed on their upper portions for receiving the curved inner sides 13 of the several extensions 11 and 12 formed on the end plates 9 and 10, these legs being secured to the casing 3 of the oven through the medium of screws 19 which are turned into engagement with screw threaded openings formed in angle brackets 20 secured to the opposite side of the casing 3 adjacent its opposite ends. In order that the legs 17 may be adjusted vertically with relation to the vertical portion 2' of the fire grate 2, we may and preferably do reduce the lower end portion thereof and form transverse serrations 21 upon the inner side thereof. Feet 22 are provided at the lower extremities of the several legs 17 and have their upper ends formed with inwardly arranged transverse serrations corresponding to the serrations 21 on the legs and slots 23 formed in the upper portions thereof adjacent said serrations whereby fastening screws 24 may be passed through the same into engagement with the lower ends of the legs 17 for firmly connecting the same thereto; it being understood that with inter-connection of the transversely serrated portions of the legs 17 and the feet 22 that a positive joint as between the same will be afforded. By reason of the slots 23 in the feet, it will be also understood that the feet may be adjusted vertically with relation to the legs 17 in order that the latter may be properly positioned with respect to the upwardly disposed portion 2' of the fire grate 2. Laterally extending fingers 25 are formed on the intermediate portions of the inner sides of the several legs 17 and are adapted to be engaged with the opposite side walls of the fire-place, as shown in the Figure 2 whereby said legs 17 together with the oven supported upon the cradles 18 thereof will be fixedly retained in their upright positions and against lateral movement with relation to the fire-place.

With a view towards providing means for imparting swinging motion to the heat deflecting element 8, a crank handle 26 is preferably formed on one end of the rod 8', preferably that end in proximity to the end plate 10; a ratchet wheel 27 being carried on the rod and adapted to be engaged by a pawl 28 pivoted to the end plate as at 28'. Thus, with rotation of the crank handle, the element 8 will be swung to the desired position with relation to the flue of the fire-place and will be held in this adjusted position through the medium of the pawl 28 engaging the ratchet 27.

From the foregoing, it will be understood that we have provided an exceedingly desirable type of fire-place oven which may be attached to the grate of a fire-place without alteration of the same or without in any way mutilating the fire-place. Furthermore, by reason of the elevated position of the oven, the effect of the fire-place will not be materially interfered with.

To vary the temperature of the oven proper 6, it is to be understood that the heat deflecting element 8 is swung to such a position with respect to the fire-place flue as to cause deflection of the desired amount of heated air. When the element 8 is in its uppermost position, such as is shown in full lines in the Figure 2, a maximum amount of heat will be taken from the fire-place and directed or circulated about the oven proper 6, while when said element is in the position as shown by dotted lines in the Figure 2, the amount of heated air caused to circulate about the oven 6 will be diminished. By reason of the adjustability of the oven, that is, through the legs 17 and their respective feet 22, the device may be successfully used in connection with practically all types of fire-places.

Manifestly, the construction shown is capable of considerable modification and such modification as is within the scope of our claims, we consider within the spirit of our invention.

We claim:

1. An oven of the character described comprising a casing having a flared lateral outwardly opening extension thereon adjacent the lower and inner sides of the same, an oven within said casing having its side walls spaced from the adjacent walls of the casing to provide an air circulating way entirely thereabout, and a horizontally pivoted damper disposed longitudinally of said extension and arranged intermediately of its upper and lower sides, the outer portion of said damper extending without said extension.

2. An oven of the character described comprising a casing having a flared laterally outwardly opening extension thereon adjacent the lower and inner sides of the same, an oven within said casing having its side walls spaced from the adjacent walls of the casing to provide an air circulating way entirely thereabout, a horizontally pivoted damper disposed longitudinally of said extension and arranged intermediately of its upper and lower sides, and means for supporting said casing and oven in position adjacent a fire place.

3. An oven of the character described, comprising a casing having a longitudinal inwardly disposed port formed in the under side thereof, the opposite side of said casing adjacent said port being formed with diagonally extending flanges, an oven proper within said casing having its side walls spaced from the corresponding walls of the casing, a heat deflecting element pivotally mounted in said longitudinal port and adapted to abut said diagonal flanges, means for facilitating movement of said heat deflecting element and other means for supporting the oven in position adjacent a fire-place.

4. An oven of the character described, comprising a casing having a longitudinal inwardly disposed port formed in the under side thereof, the sides of said casing adjacent said port being formed with diagonal flanges, an oven proper arranged within said casing, heat insulating blocks positioned between said oven proper and the inner sides of the casing for maintaining the same in spaced relation, a heat deflecting element pivotally mounted in the longitudinal port and adapted to abut said diagonal flanges, at times, and means for supporting the oven in position adjacent a fire-place.

In witness whereof we have hereunto set our hands.

ANDREW NELSON.
OSCAR H. HINNARD.